(12) United States Patent
Phan et al.

(10) Patent No.: US 7,987,952 B2
(45) Date of Patent: Aug. 2, 2011

(54) DAMPING MECHANISMS AND MOTOR ASSEMBLIES

(75) Inventors: Duc Q. Phan, Gardena, CA (US); Khiet Le, Mission Viejo, CA (US); Terence G. Ward, Redondo Beach, CA (US); Yunqi Zheng, Torrance, CA (US); Gabriel Gallegos-Lopez, Torrance, CA (US); Dang Dinh Dang, Garden Grove, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/607,727

(22) Filed: Oct. 28, 2009

(65) Prior Publication Data

US 2011/0095163 A1    Apr. 28, 2011

(51) Int. Cl.
*H02K 5/24* (2006.01)

(52) U.S. Cl. ...... 188/156; 188/158; 310/51; 310/156.74

(58) Field of Classification Search .......... 188/378–380, 188/156, 158, 160; 384/535, 536; 310/51, 310/74, 90, 90.5, 91, 156.74–156.76
See application file for complete search history.

(56) References Cited

U.S. PATENT DOCUMENTS

| | | | | |
|---|---|---|---|---|
| 6,007,252 A | * | 12/1999 | Thelen et al. | 384/535 |
| 6,126,324 A | * | 10/2000 | Ponson et al. | 384/612 |
| 6,220,829 B1 | * | 4/2001 | Thompson et al. | 417/407 |
| 6,325,546 B1 | * | 12/2001 | Storace | 384/536 |
| 2002/0081050 A1 | * | 6/2002 | Cermak | 384/536 |
| 2004/0130224 A1 | * | 7/2004 | Mogi et al. | 310/75 R |
| 2007/0012535 A1 | * | 1/2007 | Matheny | 188/378 |

* cited by examiner

*Primary Examiner* — Christopher P Schwartz
(74) *Attorney, Agent, or Firm* — Ingrassia Fisher & Lorenz, P.C.

(57) ABSTRACT

Damping mechanisms and motor assemblies are provided. In an embodiment, by way of example only, a damping mechanism includes an end cap, a bearing retainer plate, a bearing damper ring, a bearing assembly, and first and second lateral dampers. The bearing damper ring is disposed in an annular cavity inwardly from an inner diameter surface of the end cap and has a radially inwardly-extending flange. The bearing assembly is disposed in the annular cavity radially inwardly relative to the bearing damper ring. The first lateral damper is disposed between a radially inwardly-extending wall of the end cap and the bearing damper ring. The second lateral damper is disposed between the bearing damper ring and the bearing retainer plate.

20 Claims, 2 Drawing Sheets

DAMPING MECHANISMS AND MOTOR ASSEMBLIES

TECHNICAL FIELD

The inventive subject matter generally relates to motors, and more particularly relates to damping mechanisms for use in motor assemblies.

BACKGROUND

An electric motor typically includes a stator and a rotor. During motor operation, the stator remains stationary, while the rotor rotates relative to the stator. In alternating current ("AC") motors, the stator includes a current-carrying component, which generates a magnetic field to interact with the rotor. The magnetic field propels or rotates the rotor relative to the stator.

As part of the typical wear and tear of the motor, the rotor may become imbalanced. As a result, the electric motor and its components may experience unwanted vibration, which may decrease the useful life of the motor. To minimize rotor imbalance, balancing and vibration damping mechanisms may be included in the motor. For example, bearing assemblies may be mounted at both ends of the rotor to support the rotor during rotation. Although the use of bearing assemblies may decrease vibration in some motors, over time, they may become worn and may need replacement.

Accordingly, it is desirable to have balancing and vibration damping mechanisms that may improve the useful lives of electric motors. In addition, it is desirable to have balancing and vibration damping mechanisms that minimize noises from the motor. Furthermore, other desirable features and characteristics of the inventive subject matter will become apparent from the subsequent detailed description and the appended claims, taken in conjunction with the accompanying drawings and the foregoing technical field and background.

BRIEF SUMMARY

Damping mechanisms and motor assemblies are provided.

In an embodiment, by way of example only, a damping mechanism includes an end cap, a bearing retainer plate, a bearing damper ring, a bearing assembly, and first and second lateral dampers. The end cap has an inner diameter surface and a radially inwardly-extending wall. The bearing retainer plate is attached to the end cap to define an annular cavity with the inner diameter surface and the radially inwardly-extending wall of the end cap. The bearing damper ring is disposed in the annular cavity inwardly from the inner diameter surface of the end cap and has a radially inwardly-extending flange. The bearing assembly is disposed in the annular cavity radially inwardly relative to the bearing damper ring. The first lateral damper is disposed between the radially inwardly-extending wall of the end cap and the bearing damper ring. The second lateral damper is disposed between the bearing damper ring and the bearing retainer plate.

In another embodiment, by way of example only, a damping mechanism includes an end cap, a bearing retainer plate, a bearing damper ring, a bearing assembly, a radial damper, and a lateral damper. The end cap has an inner diameter surface and a radially inwardly-extending wall. The bearing retainer plate is attached to the end cap to define an annular cavity with the inner diameter surface and the radially inwardly-extending wall of the end cap. The bearing damper ring is disposed in the annular cavity inwardly from the inner diameter surface of the end cap and has a radially inwardly-extending flange and an outer diameter surface including a groove. The bearing assembly is disposed in the annular cavity radially inwardly relative to the bearing damper ring. The radial damper is disposed in the groove. The lateral damper is disposed between the radially inwardly-extending wall of the end cap and the bearing damper ring.

In still another embodiment, by way of example only, a motor assembly includes a housing, a shaft extending through the housing, a rotor mounted to the shaft, a stator surrounding the rotor, and a damping mechanism coupled to a first end of the housing to enclose the rotor and the stator in the housing. The damping mechanism includes an end cap having an inner diameter surface and a radially inwardly-extending wall, a bearing retainer plate attached to the end cap to define an annular cavity, a bearing damper ring disposed in the annular cavity inwardly from the inner diameter surface of the end cap and having a radially inwardly-extending flange, a bearing assembly disposed in the annular cavity and radially inwardly relative to the bearing damper ring, a first lateral damper disposed between the radially inwardly-extending wall of the end cap and the bearing damper ring, and a second lateral damper disposed between the bearing damper ring and the bearing retainer plate.

DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
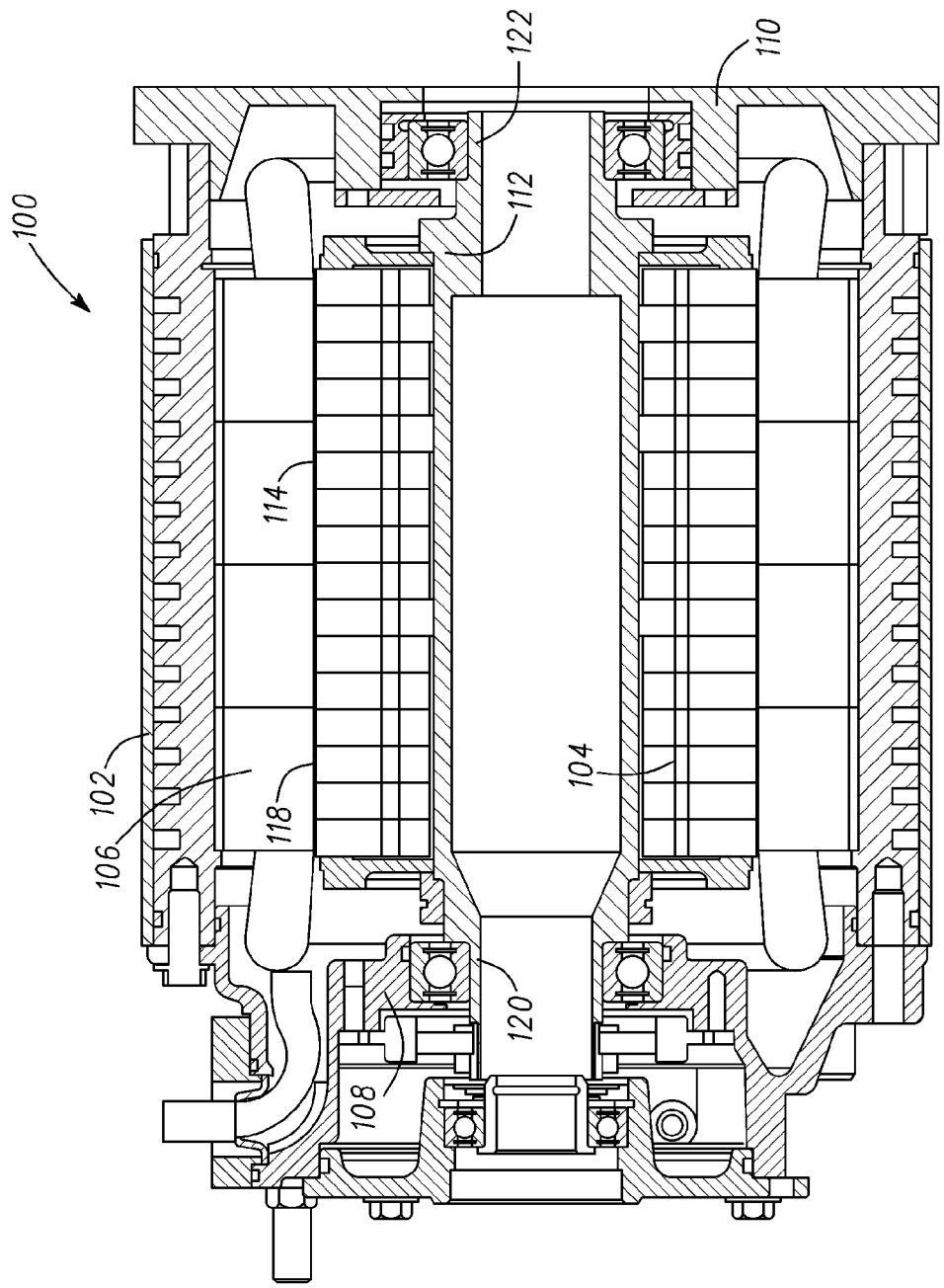
FIG. 1 is a side cross-sectional view of a motor assembly, according to an embodiment.

FIG. 1 is a side cross-sectional view of a motor assembly 100, according to an embodiment. The motor assembly 100 is configured to have an improved useful life over conventional motor assemblies and may experience a reduced magnitude of vibration and/or motor imbalance. In an embodiment, the motor assembly 100 includes a housing 102, a rotor 104, a stator 106, and damping mechanisms 108, 110. The rotor 104 is disposed within the housing 102 and is mounted to a rotatable shaft 112. The stator 106 surrounds the rotor 104 and is disposed between the rotor 104 and the housing 102. In an embodiment, an inner surface 114 of the stator 106 and an outer surface 118 of the rotor 104 are spaced apart to provide an air gap. In accordance with an embodiment, the air gap may have a width in a range of from about 2.4 mm to about 3.1 mm. In other embodiments, the width of the air gap may be larger or smaller than the aforementioned range. Each damping mechanism 108, 110 is attached to a corresponding end 120, 122 of the shaft 112, and each is employed to minimize rotor 104 imbalance and to damp vibration during motor 100 operation and to maintain the rotor 104, stator 106, and the shaft 112 within the housing 102. In an embodiment, both of the damping mechanisms 108, 110 may be substantially identical in configuration. In other embodiments, the damping mechanisms 108, 110 may be configured differently from each other.

Figure 2:
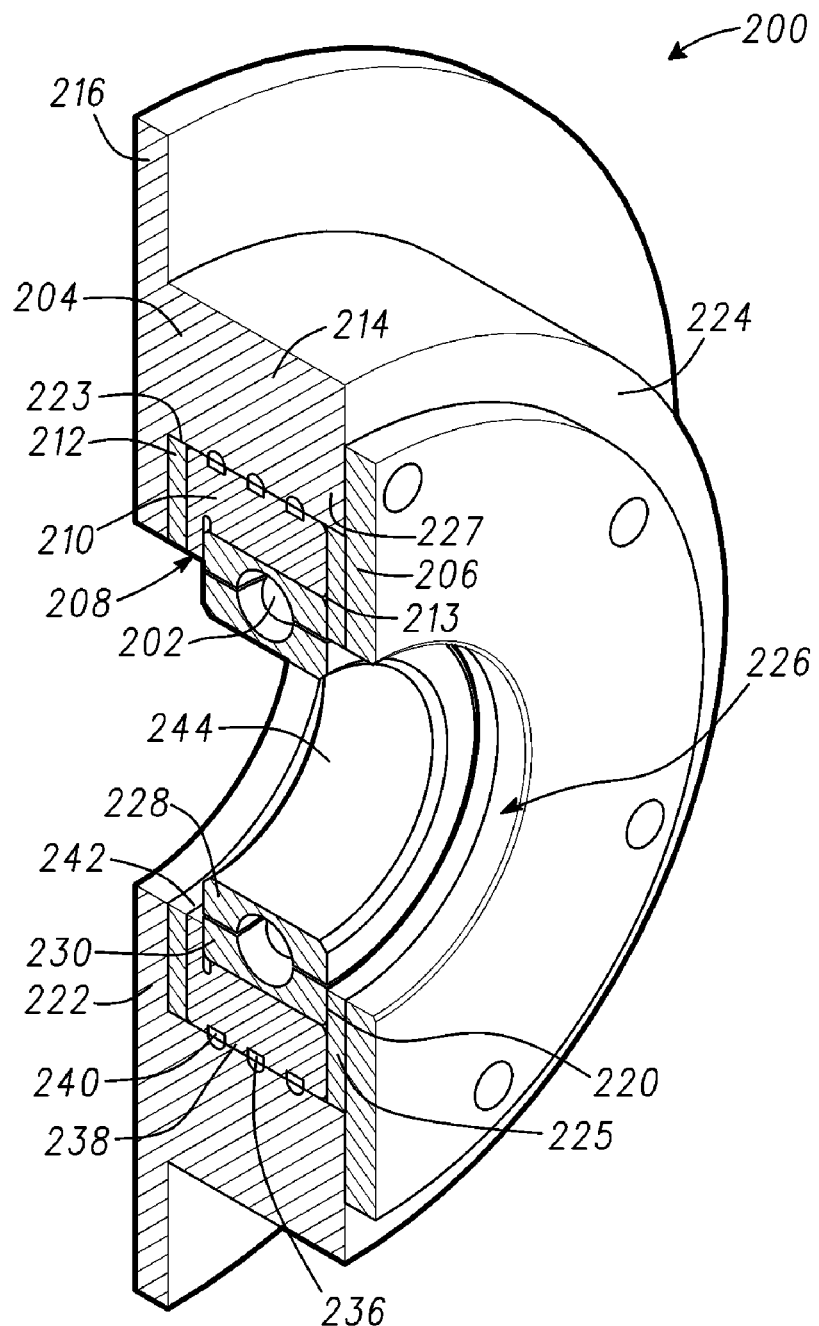
FIG. 2 is a side cross-sectional view of a damping mechanism, according to an embodiment.

FIG. 2 is a side cross-sectional view of a damping mechanism 200, according to an embodiment. According to an embodiment, the damping mechanism 200 is configured to decrease stresses that may be experienced by bearings 202 in the damping mechanism 200. In an embodiment, the damping mechanism 200 may be implemented as one or both of the damping mechanisms 108, 110 of FIG. 1. For example, in embodiments in which shaft end 120 may experience a smaller magnitude of torque from the motor 100 than shaft end 122, damping mechanism 200 may be employed for damping mechanism 110. In other embodiments in which both ends 120, 122 of shaft 112 experience a substantially equal magnitude of torque (e.g., 300 Nm±50 Nm) from motor 100, both damping mechanisms 108, 110 may include damping mechanism 200. In any case, the damping mechanism 200 includes an end cap 204, a bearing retainer plate 206, a bearing assembly 208 (including the bearings 202), a bearing damper ring 210, and lateral dampers 212, 213.

The end cap 204 fits over an end of a shaft (e.g., end 122 of shaft 112 in FIG. 1, as shown, or end 120 of shaft 112 (not shown)) of a motor assembly (e.g., motor assembly 100). In an embodiment, the end cap 204 includes a main body 214 and a radial wall 216. The main body 214 is adapted to fit into a housing of the motor assembly (e.g., housing 102), while the radial wall 216 secures the end cap 204 against the housing. In such an embodiment, the main body 214 may have an outer diameter that is smaller than an outer diameter of the radial wall 216. For example, the outer diameter of the main body 214 may be in a range of about 218 mm to about 220 mm, and the outer diameter of the radial wall 216 may be in a range of about 228 mm to about 230 mm. In other embodiments, the outer diameters may be greater or less than the aforementioned ranges, as the specific dimensions of each may depend on particular dimensions of the motor assembly housing. Although shown as a unitary component, the main body 214 and radial wall 216 may be two separate pieces that form a single component, in another embodiment. In any case, the main body 214 and radial wall 216 may comprise a material suitable for withstanding torque magnitudes in a range of about 25 Nm to about 500 Nm, in an embodiment. Examples of suitable materials include, but are not limited to, 6061 T6 Aluminum.

In accordance with an embodiment, the main body 214 and radial wall 216 are configured to provide an annular cavity 220 for containing the bearing assembly 208 and hence, the radial wall 216 may be further configured to extend radially inwardly. According to an embodiment, a sidewall 223 of the annular cavity 220 may be defined by a radially-inwardly extending portion 222 of the radial wall 216, and an annular wall of the annular cavity 220 may be defined by an inner diameter surface 225 of the main body 214. To provide a sufficient space for the bearing assembly 208 to be disposed within the annular cavity 220, the radially-inwardly extending portion 222 may have an inner diameter in a range of about 52 mm to about 55.5 mm, and the inner diameter surface of the main body 214 may have a diameter in a range of about 218 mm to about 220 mm. In other embodiments, the diameters may be greater or less than the aforementioned ranges, depending on dimensions of the bearing assembly 208 and on dimensions of the shaft onto which the damping mechanism 200 is to be mounted.

Another sidewall of the annular cavity 220 may be further defined by an inner surface 227 of the bearing retainer plate 206. In an embodiment, the bearing retainer plate 206 is attached to the main body 214 of the end cap 204. For example, the bearing retainer plate 206 may be threaded, bolted, welded or otherwise affixed to a radial surface 224 of the end cap 204. According to an embodiment, the bearing retainer plate 206 may also include an opening 226 to receive the shaft. However, in other embodiments, the opening 226 may be smaller than an outer diameter of the shaft, or the bearing retainer plate 206 may not include an opening. In accordance with an embodiment, the bearing retainer plate 206 may comprise a material that is substantially similar to that of the end cap 204. In other embodiments, the material from which the bearing retainer plate 206 comprises may be different from that of the end cap 204. For example, the bearing retainer plate 206 may comprise magnesium, steel or titanium, while the end cap 204 may be made of aluminum, steel or titanium. In other embodiments, other materials may be employed.

As briefly mentioned above, the bearing assembly 208 is disposed in the annular cavity 220 radially inwardly relative to the bearing damper ring 210. The bearing assembly 208 includes an inner race 228, an outer race 230, and a plurality of bearings 202 (only one of which is shown). The inner race 228 is configured to be mounted to the shaft, and the bearings 202 are disposed between the inner and outer races 228, 230. According to an embodiment, a bearing separator ring is disposed between the inner and outer races 228, 230, and each bearing 202 is disposed in an opening within the bearing separator ring. However, other embodiments may not include the separator ring.

To decrease a magnitude of relative movement that could occur between the bearing assembly 208 and the end cap 204 in case of rotor imbalance, the bearing damper ring 210 is disposed in the annular cavity 220. In an embodiment, the bearing damper ring 210 may be disposed inwardly from the inner diameter surface 225 of the end cap 204 and may be positioned between the end cap 204 and the outer race 230 of the bearing assembly 208. In accordance with an embodiment, the bearing damper ring 210 may comprise 4340 steel. Examples of suitable materials include, but are not limited to aluminum and magnesium. The bearing damper ring 210 has a radial thickness that is substantially equal (e.g., ±0.1 micrometers) to a distance between the inner diameter surface 225 of the end cap 204 and the outer race 230 and has an axial thickness that is less than an axial length of the inner diameter surface 225 of the end cap 204. For example, the radial thickness of the bearing damper ring 210 may be in a range of about 2 mm to about 12 mm, and the axial thickness of the bearing damper ring 210 may be in a range of about 5 mm to about 20 mm. In other embodiments, the thicknesses of the bearing damper ring 210 may be greater or less than the aforementioned ranges.

To increase friction between non-rotating surfaces the inner diameter surface 225 of the end cap 204 and the outer race 230, one or more radial dampers 240 may be disposed around the outer diameter of the bearing damper ring 210. The bearing damper ring 210 may include one or more grooves 236 in its outer diameter surface 238 to accept the radial dampers 240 and to improve positioning of the radial dampers 240 on the bearing damper ring 210. The grooves 236 may be ring-shaped or spiral-shaped, depending on the configurations of the radial dampers 240. The specific number of rings or turns around a circumference of the bearing damper ring 210 and the number of radial dampers 240 may be selected based on a particular magnitude of torque to be countered that may be exerted against the damping mechanism 200. For example, more rings or turns (e.g., 6 rings/turns or more) may be included in embodiments in which a greater magnitude of torque may be exerted (e.g., torques of 800 Nm or more), while fewer grooves 236 (e.g., 2 rings/turns or less) may be included for embodiments in which a lesser magnitude of torque may be exerted (e.g., torques of 25 Nm or less). In another embodiment, corresponding grooves may be formed in the end cap 204 for receiving the radial damper 240. In still another embodiment, the grooves may not be formed in the bearing damper ring 210 and alternatively only may be formed in the end cap 204.

In any case, the radial dampers 240 may comprise elastomeric rings, elastomeric spiral tubing or other types of tubing, and the materials from which the radial dampers 240 are comprised may be selected depending on the desired damping. In an example, the radial dampers 240 may comprise one type of solid ring or tubing comprising a first type of material having a higher modulus of elasticity, such as stainless steel when used in embodiments in which a greater magnitude of torque may be exerted, while radial dampers 240 comprising materials having a lower modulus of elasticity, such as phosphor bronze or aluminum, may be included for embodiments in which a lesser magnitude of torque may be exerted. Suitable elastomeric rings may include elastomeric O-rings or annular tubing rings. Examples of elastomeric spiral tubing include, but are not limited to, rubber tubing, or tubing comprising silicone or polyethane. The elastomeric spiral tubing may include an elastomeric tube filled with an inert gas (e.g., nitrogen or air) or a gel, in an embodiment. In another embodiment, spiral tubing may include tubing comprising a metal alloy, such as brass, stainless steel or phosphor bronze sealed and filled with a gas or gel.

The bearing damper ring 210 may include a radially inwardly-extending flange 242 to provide a surface against which the bearing assembly 208 abuts. In an embodiment, the radially inwardly-extending flange 242 may be configured to extend from the inner diameter surface of the main body 214 of the end cap 204 up to a sidewall of the radially-inwardly extending portion 222 of the end cap 204. According to an embodiment, the radially inwardly-extending flange 242 may have a radial length that is substantially equal (e.g., ±0.1 micrometers) to a radial thickness of the bearing assembly outer race 230.

In any case, lateral movement of the bearing damper ring 210 may be restricted by one or more lateral dampers 212, 213. In an embodiment, a first lateral damper 212 is disposed between the radially-inwardly extending portion 222 of the end cap 204 and the radially inwardly-extending flange 242 of the bearing damper ring 210. The second lateral damper 213 is disposed between the bearing damper ring 210 and the bearing retainer plate 206. Depending on the dimensions of the annular cavity and components disposed in the annular cavity, the lateral dampers 212, 213 may have axial thicknesses in a range of about 1 mm to about 1.5 mm and radial lengths in a range of about 72 mm to about 100 mm, in an embodiment. However, in other embodiments in which the annular cavity 220 and/or components in the annular cavity 220 are larger or smaller, the axial thicknesses and/or radial lengths of the later dampers 212, 213 may be greater or less than the aforementioned ranges.

The lateral dampers 212, 213 may comprise gaskets, including, but not limited to elastomeric gaskets. The material comprising the gaskets may be selected based, in part, on damper quality. For example, a softer material, such as rubber, silicone or another elastomeric material may be employed for the lateral dampers 212, 213 in embodiments in which a Shore A durometer thereof is between 70 and 100. Harder materials, such as spiral spring, coiled spring or wave steel may be employed in embodiments in which the lateral dampers 212, 213 are used for high temperature application. In an embodiment, both of the lateral dampers 212, 213 may comprise substantially similar materials or identically-formulated materials. In other embodiments, in order to provide transmissibility, the lateral dampers 212, 213 may comprise different materials (e.g. a combination of an elastomer, high temperature polymer and a metal).

Although single lateral dampers are shown as being included on either side of the bearing assembly 208, alternatively, more than one lateral damper may be included in other embodiments. For example, one or more additional lateral dampers may be disposed adjacent to the first lateral damper 212, in an embodiment. Alternatively or in addition, one or more additional lateral dampers may be disposed adjacent to the second lateral damper 213, in an embodiment. Moreover, the number of lateral dampers may be unequal on either side of the bearing assembly 208, in alternate embodiments.

In any case, by including the aforementioned lateral dampers 212, 213 and radial dampers 240 with the above-described bearing damper ring 210, microwalking (e.g., re-positioning of the bearing damper ring 210 due to vibration from rotor imbalance) of the bearing assembly 208 in a motor may be decreased as compared to conventional bearing assemblies employed in a substantially similar motor. It has been found that a useful life of a bearing may increase, as compared with bearings used in conventional motors. Alternatively, the bearings may be employed in motors having rotors that operate at increased speeds, as compared to conventional motors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A damping mechanism for a motor, the damping mechanism comprising:
    an end cap having an inner diameter surface and a radially inwardly-extending wall;
    a bearing retainer plate attached to the end cap to define an annular cavity with the inner diameter surface and the radially inwardly-extending wall of the end cap;
    a bearing damper ring disposed in the annular cavity inwardly from the inner diameter surface of the end cap and having a radially inwardly-extending flange;
    a bearing assembly disposed in the annular cavity and radially inwardly relative to the bearing damper ring;
    a first lateral damper disposed between the radially inwardly-extending wall of the end cap and the bearing damper ring; and
    a second lateral damper disposed between the bearing damper ring and the bearing retainer plate.

2. The damping mechanism of claim 1, wherein:
    the bearing damper ring has an outer diameter surface including a groove; and
    the damping mechanism further comprises a radial damper disposed in the groove.

3. The damping mechanism of claim 1, wherein:
the bearing damper ring has an outer diameter surface including a ring-shaped groove; and
the damping mechanism further comprises a ring-shaped radial damper disposed in the ring-shaped groove.

4. The damping mechanism of claim 3, wherein:
the ring-shaped radial damper comprises an elastomeric ring.

5. The damping mechanism of claim 1, wherein:
the bearing damper ring has an outer diameter surface including a spiral-shaped groove; and
the damping mechanism further comprises a spiral-shaped radial damper disposed in the spiral-shaped groove.

6. The damping mechanism of claim 5, wherein:
the spiral-shaped radial damper comprises spiral tubing.

7. The damping mechanism of claim 6, wherein:
the spiral tubing includes an inert gas or gel.

8. The damping mechanism of claim 1, wherein:
the bearing damper ring comprises a plurality of grooves; and
the damping mechanism further comprises a plurality of radial dampers corresponding to and disposed in the plurality of grooves.

9. The damping mechanism of claim 1, wherein the first lateral damper and the second lateral damper comprise elastomeric gaskets.

10. The damping mechanism of claim 1, further comprising a third lateral damper adjacent to the first lateral damper.

11. The damping mechanism of claim 1, further comprising:
a second lateral damper disposed between the bearing damper ring and the bearing retainer plate.

12. A damping mechanism for a motor, the damping mechanism comprising:
an end cap having an inner diameter surface and a radially inwardly-extending wall;
a bearing retainer plate attached to the end cap to define an annular cavity with the inner diameter surface and the radially inwardly-extending wall of the end cap;
a bearing damper ring disposed in the annular cavity inwardly from the inner diameter surface of the end cap and having a radially inwardly-extending flange and an outer diameter surface including a groove;
a bearing assembly disposed in the annular cavity and radially inwardly relative to the bearing damper ring;
a radial damper disposed in the groove; and
a first lateral damper disposed between the radially inwardly-extending wall of the end cap and the bearing damper ring.

13. A motor assembly, comprising:
a housing;
a shaft extending through the housing;
a rotor mounted to the shaft;
a stator surrounding the rotor;
a first damping mechanism coupled to a first end of the housing to enclose the rotor and the stator in the housing, the first damping mechanism including:
a first end cap having an inner diameter surface and a first radially inwardly-extending wall;
a first bearing retainer plate attached to the first end cap to define a first annular cavity;
a first bearing damper ring disposed in the first annular cavity inwardly from the inner diameter surface of the first end cap and having a first radially inwardly-extending flange;
a first bearing assembly disposed in the first annular cavity and radially inwardly relative to the first bearing damper ring;
a first lateral damper disposed between the first radially inwardly-extending wall of the first end cap and the first bearing damper ring; and
a second lateral damper disposed between the first bearing damper ring and the first bearing retainer plate.

14. The motor assembly of claim 13, wherein:
the bearing damper ring has an outer diameter surface including a groove; and
the damping mechanism further comprises a radial damper disposed in the groove.

15. The motor assembly of claim 13, wherein:
the bearing damper ring has an outer diameter surface including a ring-shaped groove; and
the damping mechanism further comprises a ring-shaped radial damper corresponding to and disposed in the ring-shaped groove.

16. The motor assembly of claim 13, wherein:
the bearing damper ring has an outer diameter surface including a spiral-shaped groove; and
the damping mechanism further comprises a spiral-shaped radial damper corresponding to and disposed in the spiral-shaped groove.

17. The motor assembly of claim 13, wherein:
the bearing damper ring has an outer diameter surface including a plurality of grooves; and
the damping mechanism further comprises a plurality of radial dampers corresponding to and disposed in the plurality of grooves.

18. The motor assembly of claim 13, further comprising:
a second damping mechanism coupled to a second end of the housing to enclose the rotor and the stator in the housing.

19. The motor assembly of claim 13, wherein the first lateral damper and the second lateral damper comprise elastomeric gaskets.

20. The motor assembly of claim 13, further comprising a third lateral damper adjacent to the first lateral damper.

* * * * *